United States Patent [19]

Taber

[11] 4,193,511

[45] Mar. 18, 1980

[54] APPARATUS FOR MANUAL MANIPULATION OF ARTICLES

[76] Inventor: Gilbert L. Taber, R.D. 2, Lockpit Rd., Clyde, N.Y. 14433

[21] Appl. No.: 905,218

[22] Filed: May 12, 1978

[51] Int. Cl.$^2$ .......................... A47F 1/12; B65G 11/14
[52] U.S. Cl. .......................................... 221/66; 193/8; 198/485
[58] Field of Search ................... 221/65, 66; 198/485, 198/736, 747; 193/2 R, 8, 30; 414/265, 373; 109/19; 232/1 R, 44, 45

[56] References Cited

U.S. PATENT DOCUMENTS

| 1,700,060 | 1/1929 | Kirkman | 221/66 |
| 2,781,964 | 2/1957 | Ledgerwood | 232/45 X |
| 3,390,833 | 7/1968 | Harris | 232/44 X |

*Primary Examiner*—F. J. Bartuska
*Attorney, Agent, or Firm*—Charles S. McGuire

[57] ABSTRACT

Apparatus which assists in the manual manipulation of articles intended especially for use in delivery of articles such as newspapers from the interior of an automobile to a stationary open receptacle for such articles. The apparatus includes two open-ended, tubular sections one of which is mounted to receive articles placed manually in one end thereof, e.g., from within the automobile, and which communicates at the other end with the second section. A plunger is arranged with a first end positioned for manipulation from within the auto and a second end slidingly movable within the second section. Thus, articles successively inserted into the one end of the first section are moved toward and into the second section from which they are ejected, into an open mailbox or the like positioned adjacent the second section, by movement of the plunger. The second section is mounted for telescoping movement between extended and retracted positions with respect to the first section.

8 Claims, 6 Drawing Figures

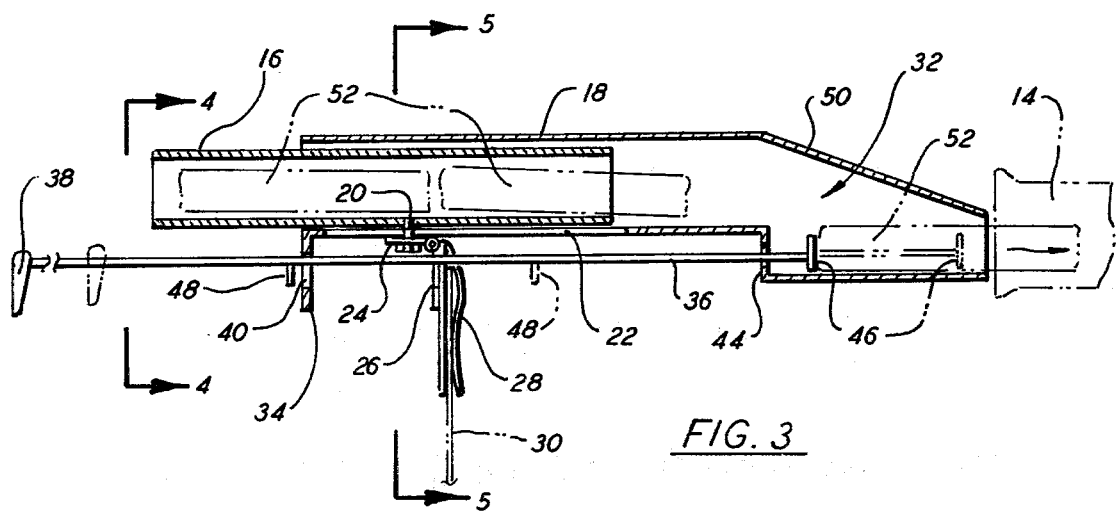
FIG. 3
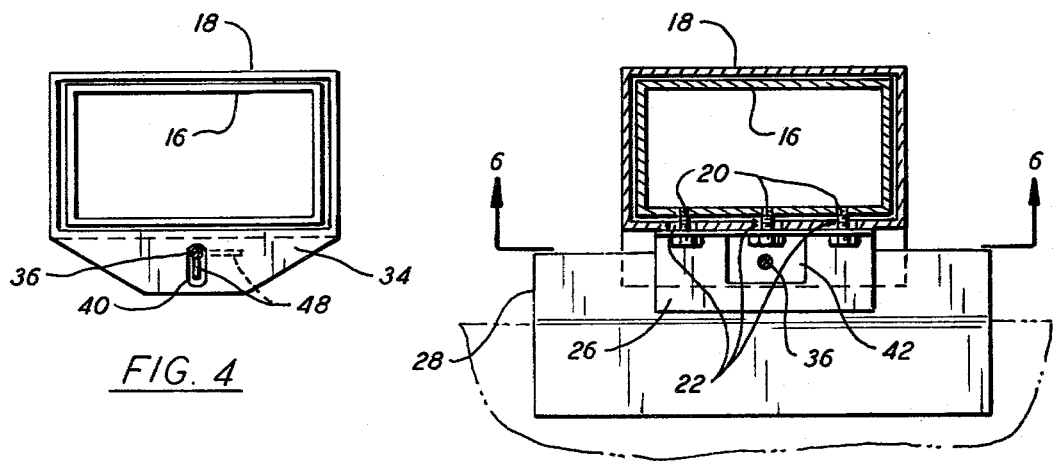
FIG. 4
FIG. 5
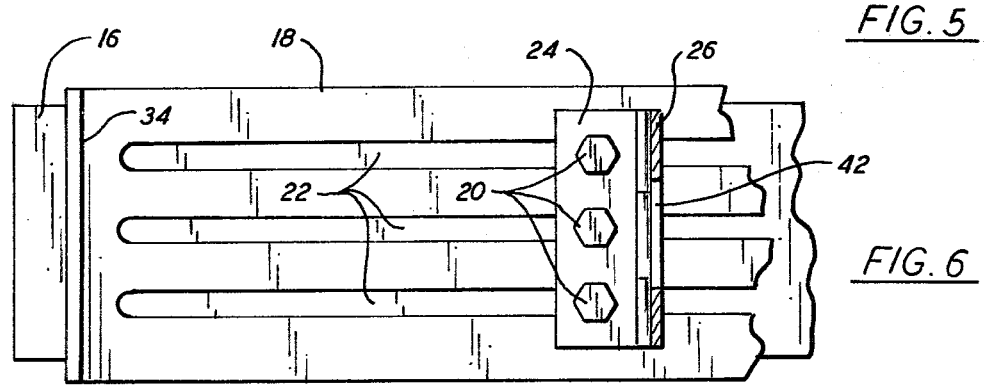
FIG. 6

APPARATUS FOR MANUAL MANIPULATION OF ARTICLES

BACKGROUND OF THE INVENTION

The present invention relates to manually operable apparatus for moving articles from one location to another, and more specifically to apparatus useful in placing mail, newspapers, etc., into a mail box or other open receptacle from the interior of a vehicle.

It is a common practice, particularly in rural or suburban areas, to deliver mail, newspaper and other printed materials to outside mail boxes or newspaper tubes from automobiles or other vehicles. In the usual case, the operator is the only occupant of the vehicle and must therefor perform the task of placing the materials in the receptacles as well as driving the vehicle. In order to make the delivery without leaving the vehicle, it is necessary for the driver to move to the right side of the auto and reach out of the right window in order to place the material in the box, then to move back to the left side in order to drive the vehicle to the next delivery location. Obviously, the process is very inconvenient and time consuming.

It is a principal object of the present invention to provide apparatus for facilitating the delivery of materials in the nature of newspapers to open receptacles therefor from the interior of a vehicle.

A further object is to provide apparatus which may be attached to a vehicle for successive insertion of a plurality of rolled papers, or similar articles, which may be manually manipulated by an operator of the vehicle into an adjacent open receptacle.

Another object is to provide a simple and inexpensive device for mounting on a motor vehicle to allow an operator to deliver articles through a window on the right side of the vehicle to a mail box or other such open receptacle without leaving the driver's seat.

Other objects will in part be obvious and will in part appear hereinafter.

SUMMARY OF THE INVENTION

In accordance with the foregoing objects, the invention comprises a pair of tubular sections, mounted for relative telescoping movement and open at both ends. The inner section is attached by screws passing through elongated slots in the outer section to a hinge which is connected to a spring clip. The spring clip is engaged over the upper edge of the right front window, which is partly or fully lowered, of a vehicle with which the apparatus is employed. The outer section, in addition to the portion telescopingly engaged with the inner section, includes a secondary compartment at the outer end, i.e., the end furthest from the vehicle.

An elongated rod extends from a manually engageable handle at one end, through an opening in a plate fixedly attached to the outer section, through an opening in a wall and into the secondary compartment thereof. A bar transversely affixed to the end of the rod within the secondary compartment forms plunger means for pushing items out of the secondary compartment through the open end of the outer section. The rod may be manuallly manipulated by the handle from the driver's seat of the vehicle to move the outer section slidingly upon the inner section and also to move the plunger independently of the outer section as items are pushed out of the apparatus. Thus, items such as rolled-up papers may be inserted into the end of the inner section and pushed by succeedingly inserted items into the secondary compartment of the outer section. The rod may then be extended to move the outer end of the outer section into registration with an open receptacle, and further extended so that the plunger means pushes the item out of the apparatus and into the open receptacle.

BRIEF DESCRIPTION OF THE DRAWINGS

FIG. 3 is also a sectional, side elevational view showing the elements in second relative positions;

FIG. 4 is an end view as seen from the line 4—4 of FIG. 3;

FIG. 5 is a sectional view, taken on the line 5—5 of FIG. 3; and

FIG. 6 is a fragmentary, bottom plan view of portions of the apparatus, other portions being in section on the line 6—6 of FIG. 5.

DETAILED DESCRIPTION

Figure 1:
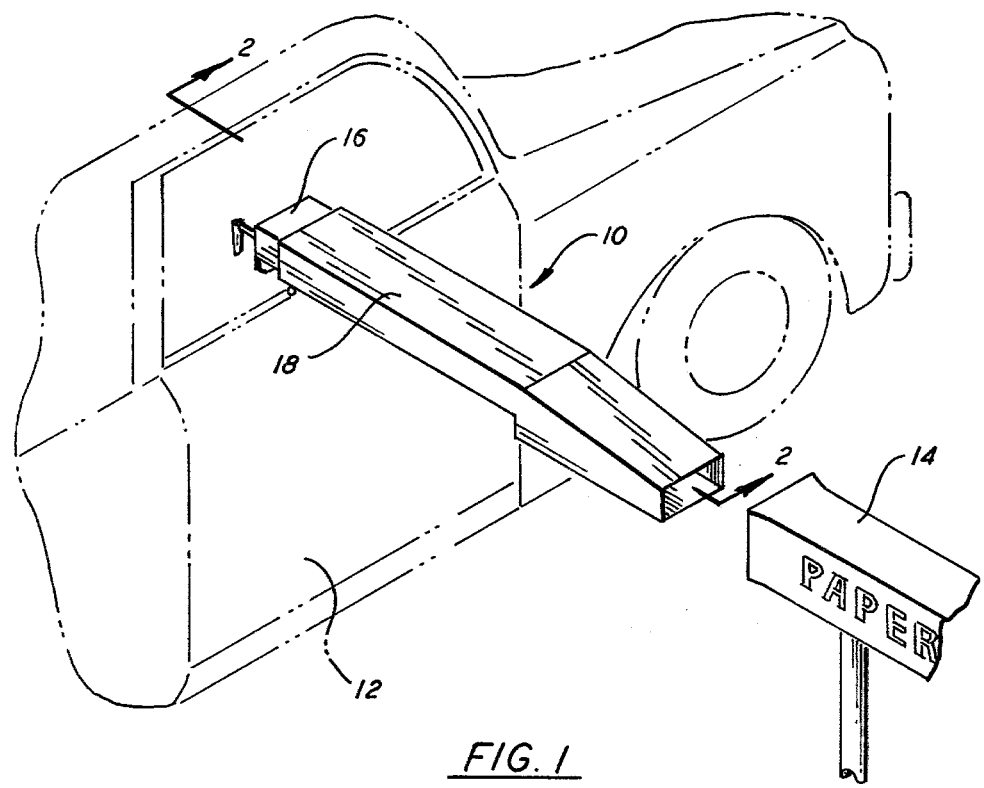
FIG. 1 is a perspective view of the apparatus of the invention, with fragments of an automobile and newspaper receptacle shown to illustrate the intended use of the apparatus.

Referring now to the drawings, the apparatus of the invention, denoted generally by reference numeral 10, is shown in FIG. 1 mounted upon automobile 12 for use in delivering newspapers or similar articles to receptacle 14. The latter is a stationary, horizontally disposed, open-ended tube or box-like structure of the type conventionally provided for delivery of newspapers, shopping guides, and other such printed matter which is usually folded or rolled into more or less tubular form for insertion into the receptacle. The receptacle, articles to be placed therein, and vehicle from which the articles are delivered, of course, form no part of the present invention, but are illustrated in order to provide a clear idea of the principal contemplated manner of its employment. It should also be emphasized that the relative proportions indicated in FIG. 1 are not necessarily accurate. For example, it would probably be desirable in practice to make apparatus 10 much smaller in comparison to the automobile, but the apparatus is shown in larger scale in order to convey more clearly the details of construction of the invention.

Apparatus 10 includes inner and outer, tubular, telescopingly engaged sections 16 and 18, respectively, each of which is open at both ends. Inner section 16 is connected by screws 20, which pass through elongated slots 22 in out section 18, to hinge plate 24. The other hinge plate 26 is fixedly attached to one side of spring clip 28. Apparatus 10 is mounted on vehicle 12 by engaging spring clip 28 over the upper edge of right front window 30 which is partly or fully lowered so that apparatus 10 extends through the window. Outer section 18 is loosely engaged between hinge plate 24 and inner section 16 so that section 18 is slidably movable upon section 16 as the latter is held stationary by its connection to the hinge, clip and window.

Inner section 16 is of uniform cross section along its entire length. Outer section 18 is of the same cross section for a length corresponding approximately to the length of inner section 16, having inside dimensions slightly larger than the external dimensions of section 16. In addition, outer section 18 includes a secondary compartment, indicated generally by reference numeral 32, enclosed by wall means forming about one-third of its total length at the outer end, i.e., the end outside the vehicle. Plate 34 is attached to, or formed integrally with, outer section 18 and extends downwardly from the lower edge thereof at the end inside vehicle 12.

Elongated rod 36 extends from manually engageable handle 38 inside the vehicle, through elongated opening 40 (FIG. 4) in plate 34, through cut-out area 42 (FIG. 5) in hinge plate 26, and through a similar opening in depending wall section 44 (FIGS. 2 & 3) of section 18, into compartment 32. Flat bar 46 is pivotally attached to the end of rod 36 inside compartment 32, whereby the rod may be rotated without rotating the bar. Spur 48 extends fixedly from rod 36 at a point thereon such that when rod 36 is moved inwardly to the maximum extent possible (i.e., when bar 46 engages wall section 44), spur 48 is on the inner side of plate 34 as shown in solid lines in FIG. 3. Rod 36 may be rotated to allow passage of spur 48 through opening 40 in plate 34 or to prevent such passage, as indicated in solid and dotted lines, respectively, in FIG. 4.

Figure 2:
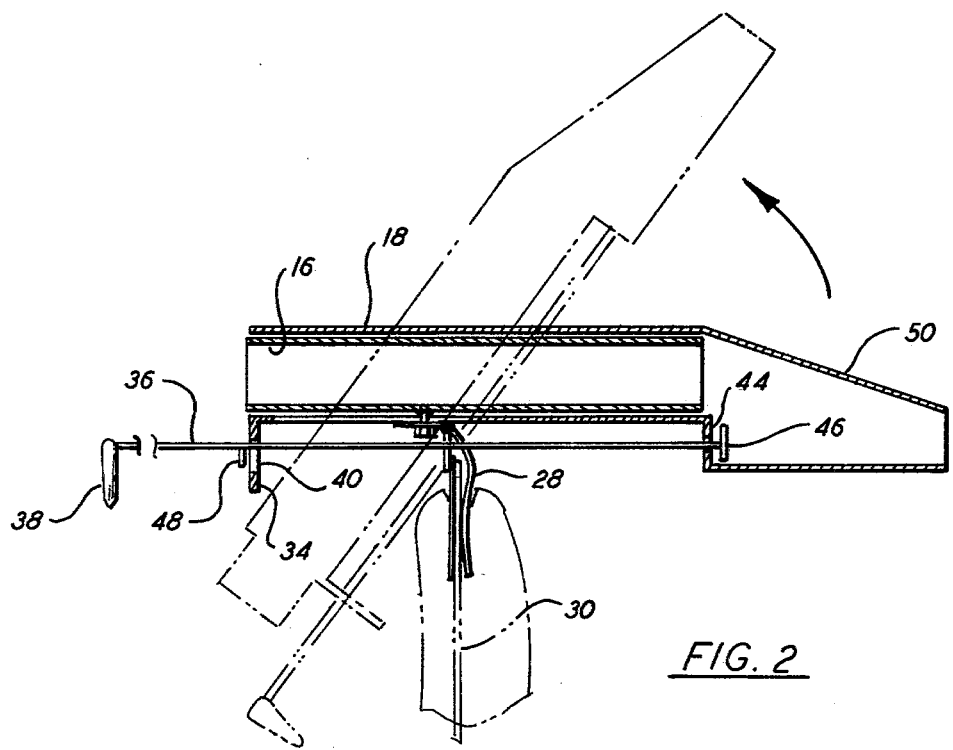
FIG. 2 is a side elevational view in section on the line 2—2 of FIG. 1, showing the elements in first relative positions of movement, and further showing in phantom lines a second position of the entire apparatus in movement about a first axis of a hinged mounting thereof.

Operation of apparatus 10 is as follows: the vehicle operator reaches to the right of the vehicle, grasps handle 38 and moves apparatus 10 about its hinged connection to the window-mounted spring clip to the position shown in solid lines in FIG. 2. Initially, rod 36 is moved inwardly to the maximum extent possible with respect to section 18, and section 18 is likewise positioned inwardly to the maximum extent possible, as limited by contact of downwardly sloping wall section 50 with the outer end of inner section 16, or by contact of the ends of slots 22 with screws 20, or both. The operator then inserts the items to be delivered successively into the inner end of section 16. In the illustrated embodiment, the items are newspapers or the like in a rolled-up condition, as shown in FIG. 3 and indicated by reference numeral 52. Each paper will be pushed by successively inserted papers farther into section 16 and thence into compartment 32 of section 18. Although the relative dimension may, of course, vary, in the illustrated example papers 52 are about one-third the total length of outer section 18. Thus, after insertion of three papers, the first paper will be pushed into compartment 32, outwardly of retracted bar 46. Rod 36 is rotated to position spur 48 for contact with plate 34, (i.e., in the dotted line position of FIG. 4) and handle 38 is pushed outwardly thereby slidably moving section 18 outwardly until the outer end thereof is closely adjacent open ended receptacle 14, as shown in FIG. 3. Rod 36 is then rotated to allow passage of spur 48 through slot 40 and handle 38 is pushed outwardly again, moving rod 36 and bar 46 from the solid to the dotted line positions of FIG. 3, and pushing the outermost paper 52 from compartment 32 into receptacle 14. Handle 38 is then pulled inwardly to return the elements to the initial positions described above, and another paper may then be inserted to repeat the operation.

What is claimed is:

1. Apparatus for manually manipulating articles from a first to a second location comprising:
   (a) fixed support means;
   (b) a first, hollow, tubular section attached to said fixed support means and having a first open end positioned at said first location, and a second open end;
   (c) a second, hollow, tubular section mounted upon said first member for telescoping movement between retracted and extended positions with respect thereto and having a first open end communicating with said second open end of said first member, and a second open end positioned at said second location; and
   (d) plunger means mounted for longitudinal sliding movement with respect to both of said tubular sections and having a first end positioned for manual manipulation at said first location and a second end positioned within said second section for movement between a retracted position therein and an extended position substantially adjacent said second end of said second section, whereby a succession of articles may be manually inserted in said first end of said first section, each article being moved by the successively inserted articles through said first and second sections until one article is positioned for contact by said second end of said plunger means and movement thereby to and out of said second end of said second section as said plunger means is moved from said retracted to said extended position.

2. The invention according to claim 1 wherein said support means comprises an element adapted for releasable engagement with a vehicle window.

3. The invention according to claim 2 wherein said plunger means comprises an elongated rod having a manually engageable handle at said first end and an article-engaging member at said second end, and means supporting said rod for both longitudinal and rotational movement.

4. The invention according to claim 3 wherein said rod includes a portion selectively engageable with said second section to effect movement thereof with respect to said first section.

5. The invention according to claim 1 wherein said second section includes a first portion extending from said first open end for a predetermined portion of the length of said first section, said first portion being telescopingly engaged with said first section, and a second portion defining a secondary compartment extending from said first section to said second open end.

6. The invention according to claim 5 wherein said secondary compartment includes a lower wall which lies in a vertical plane lower than said first section and said first portion of said second section when said first and second sections are substantially horizontally arranged.

7. The invention according to claim 5 wherein said second end of said plunger means includes an article-engaging member arranged within said secondary compartment.

8. The invention according to claim 7 wherein said plunger means comprises an elongated rod having said article-engaging member at said second end and a manually engageable handle at said first end, and further including a fixed element extending radially from said rod for selective engagement with a portion of said second section to effect movement thereof with respect to said second section.

* * * * *